(12) United States Patent
Yamazaki et al.

(10) Patent No.: US 12,212,023 B2
(45) Date of Patent: Jan. 28, 2025

(54) CELL STACK DEVICE, MODULE, MODULE HOUSING DEVICE, AND METAL MEMBER

(71) Applicant: KYOCERA CORPORATION, Kyoto (JP)

(72) Inventors: Koji Yamazaki, Kirishima (JP); Fumito Furuuchi, Kirishima (JP)

(73) Assignee: Kyocera Corporation, Kyoto (JP)

( * ) Notice: Subject to any disclaimer, the term of this patent is extended or adjusted under 35 U.S.C. 154(b) by 257 days.

(21) Appl. No.: 17/774,744

(22) PCT Filed: Oct. 8, 2020

(86) PCT No.: PCT/JP2020/038213
§ 371 (c)(1),
(2) Date: May 5, 2022

(87) PCT Pub. No.: WO2021/106384
PCT Pub. Date: Jun. 3, 2021

(65) Prior Publication Data
US 2022/0376271 A1  Nov. 24, 2022

(30) Foreign Application Priority Data
Nov. 29, 2019  (JP) .............................. 2019-216805

(51) Int. Cl.
*H01M 8/0228* (2016.01)
*H01M 8/021* (2016.01)
*H01M 8/2475* (2016.01)

(52) U.S. Cl.
CPC ......... *H01M 8/0228* (2013.01); *H01M 8/021* (2013.01); *H01M 8/2475* (2013.01)

(58) Field of Classification Search
CPC .. H01M 8/0228; H01M 8/021; H01M 8/2475; H01M 8/04; H01M 8/12; H01M 8/2465; H01M 8/0236; Y02E 60/50; Y02P 70/50
See application file for complete search history.

(56) References Cited

U.S. PATENT DOCUMENTS

| 2009/0297917 | A1 | 12/2009 | Higashi et al. |
| 2012/0315564 | A1 | 12/2012 | Fujimoto et al. |
| 2013/0130146 | A1 | 5/2013 | Batawi et al. |
| 2013/0260276 | A1* | 10/2013 | Chang ................. H01M 8/0245 204/192.15 |

(Continued)

FOREIGN PATENT DOCUMENTS

| CN | 104321917 A | 1/2015 |
| CN | 107431215 A | 12/2017 |

(Continued)

*Primary Examiner* — Ula C Ruddock
*Assistant Examiner* — Sarika Gupta
(74) *Attorney, Agent, or Firm* — Procopio, Cory, Hargreaves & Savitch LLP

(57) ABSTRACT

A cell stack device includes a cell stack and an end current collector. The cell stack includes a plurality of cells arrayed therein. The end current collector is located in an end portion of the cell stack in an array direction of the plurality of cells. The end current collector includes a surface exposed to an oxidizing atmosphere covered with a covering material including manganese and a surface exposed to a reducing atmosphere covered with a film different from the covering material.

12 Claims, 9 Drawing Sheets

(56) References Cited

U.S. PATENT DOCUMENTS

| | | |
|---|---|---|
| 2015/0155571 A1 | 6/2015 | Higashi |
| 2016/0233524 A1 | 8/2016 | Leah et al. |
| 2018/0123143 A1 | 5/2018 | Sato et al. |
| 2018/0212251 A1* | 7/2018 | Imanaka ............. H01M 8/2485 |
| 2018/0323446 A1 | 11/2018 | Tanimura et al. |

FOREIGN PATENT DOCUMENTS

| | | |
|---|---|---|
| CN | 107851817 A | 3/2018 |
| CN | 108140854 A | 6/2018 |
| JP | 2003-346843 A | 12/2003 |
| JP | 2007-149618 A | 6/2007 |
| JP | 2011-181291 A | 9/2011 |
| JP | 2012-023062 A | 2/2012 |
| JP | 2015-502014 A | 1/2015 |
| JP | 2015-162357 A | 9/2015 |
| JP | 2018-508955 A | 3/2018 |
| JP | 2018-113246 A | 7/2018 |
| WO | 2007/049759 A1 | 5/2007 |
| WO | 2011/105578 A1 | 9/2011 |
| WO | 2017/069033 A1 | 4/2017 |

\* cited by examiner

CELL STACK DEVICE, MODULE, MODULE HOUSING DEVICE, AND METAL MEMBER

TECHNICAL FIELD

The present disclosure relates to a cell stack device, a module, a module housing device, and a metal member.

BACKGROUND ART

In recent years, various fuel cell stack devices each including a plurality of fuel cells arrayed therein have been proposed as next-generation energy sources, the plurality of fuel cells being each a type of cell capable of generating electrical power using a fuel gas such as a hydrogen-containing gas and an oxygen-containing gas such as air.

In such a fuel cell stack device, an end current collector made of a metal material is located, for example, in an end portion of a cell stack in an array direction of the plurality of fuel cells (see Patent Document 1).

CITATION LIST

Patent Literature

Patent Document 1: JP 2015-162357 A

SUMMARY OF INVENTION

A cell stack device according to an aspect of an embodiment includes a cell stack and an end current collector. The cell stack includes a plurality of cells arrayed therein. The end current collector is located in an end portion of the cell stack in an array direction of the plurality of cells. A surface exposed to an oxidizing atmosphere in the end current collector is covered with a covering material containing manganese, and a surface exposed to a reducing atmosphere in the end current collector is covered with a film different from the covering material.

DESCRIPTION OF EMBODIMENTS

Hereinafter, embodiments of a cell stack device, a module, a module housing device, and a metal member that are disclosed in the present application will be described with reference to the accompanying drawings. The disclosure is not limited by the following embodiments.

Note, further, that the drawings are schematic and that the dimensional relationships between elements, the proportions thereof, and the like may differ from the actual ones. There may be differences between the drawings in the dimensional relationships, proportions, and the like.

In recent years, various fuel cell stack devices each including a plurality of fuel cells arrayed therein have been proposed as next-generation energy sources, the plurality of fuel cells being each a type of cell capable of generating electrical power using a fuel gas such as a hydrogen-containing gas and an oxygen-containing gas such as air.

In such a fuel cell stack device, an end current collector made of a metal material is located, for example, in an end portion of a cell stack in an array direction of the plurality of fuel cells.

However, the aforementioned end current collector is exposed to both an oxidizing atmosphere such as air and a reducing atmosphere such as a hydrogen-containing gas at different sites, and a surface thereof may be durable against one of the atmospheres while less durable against the other of the atmospheres.

Thus, a technique to overcome the aforementioned problem and improve the durability of the fuel cell stack device awaits realization.

Configuration of Cell

First, an example of a solid oxide fuel cell will be described as a cell constituting a cell stack device according to an embodiment with reference to FIGS. 1A to 1C.

Figure 1A:
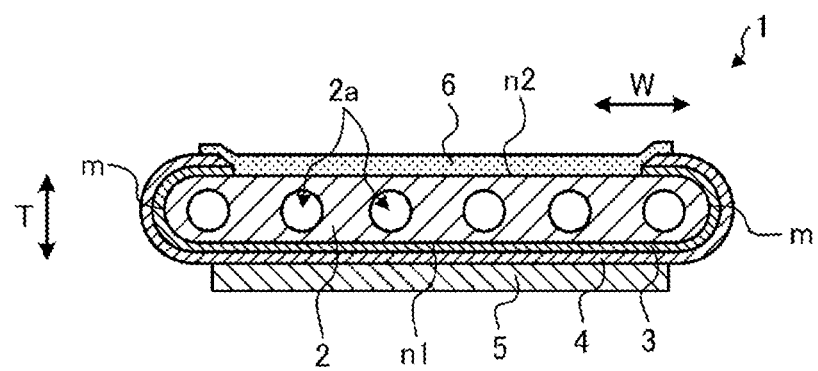
FIG. 1A is a horizontal cross-sectional view illustrating an example of a cell according to an embodiment.

FIG. 1A is a horizontal cross-sectional view illustrating an example of a cell 1 according to an embodiment. FIG. 1B is a side view illustrating an example of the cell 1 according to the embodiment when viewed from an air electrode 5 side. FIG. 1C is a side view illustrating an example of the cell 1 according to the embodiment when viewed from an interconnector 6 side. Note that FIGS. 1A to 1C each illustrate an enlarged part of a configuration of the cell 1.

Figure 1B:
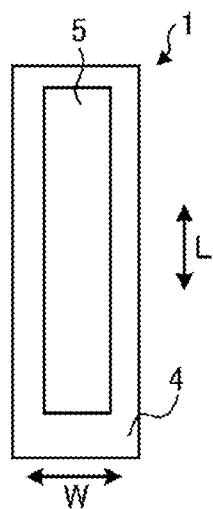
FIG. 1B is a side view illustrating an example of a cell according to the embodiment when viewed from an air electrode side.
Figure 1C:
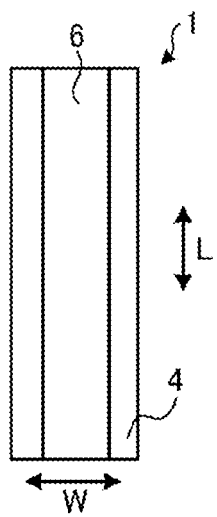
FIG. 1C is a side view illustrating an example of the cell according to the embodiment when viewed from an interconnector side.

In the example illustrated in FIGS. 1A to 1C, the cell 1 has a hollow flat plate shape or an elongated plate shape. As illustrated in FIG. 1B, the overall shape of the cell 1 when viewed from the side is, for example, a rectangle having a side length of from 5 cm to 50 cm in a length direction L and a length of from 1 cm to 10 cm in a width direction W orthogonal to the length direction L. The total length (thickness direction T) of the cell 1 is from 1 mm to 5 mm.

As illustrated in FIG. 1A, the cell 1 includes a support substrate 2 that is conductive, an element portion, and an interconnector 6. The support substrate 2 has a columnar shape having a pair of a first flat surface n1 and a second flat surface n2 that face each other, and a pair of arc-shaped side surfaces m that connect the first flat surface n1 and the second flat surface n2.

The element portion is located on the first flat surface n1 of the support substrate 2. The element portion includes a fuel electrode 3, a solid electrolyte layer 4, and an air electrode 5. In the example illustrated in FIG. 1A, the interconnector 6 is located on the second flat surface n2 of the cell 1.

As illustrated in FIG. 1B, the air electrode 5 does not extend to a lower end of the cell 1. At the lower end portion of the cell 1, only the solid electrolyte layer 4 is exposed on a surface of the first flat surface n1. As illustrated in FIG. 1C, the interconnector 6 may extend to the lower end of the cell 1. At the lower end portion of the cell 1, the interconnector 6 and the solid electrolyte layer 4 are exposed on the surface. Note that, as illustrated in FIG. 1A, the solid electrolyte layer 4 is exposed on surfaces of the pair of arc-shaped side surfaces m of the cell 1. The interconnector 6 may or may not extend to the lower end of the cell 1.

Hereinafter, respective constituent members constituting the cell 1 will be described.

The support substrate 2 is provided therein with gas flow paths 2a through which a gas flows. FIG. 1A illustrates an example in which six gas flow paths 2a extending along the length direction are provided. The support substrate 2 has gas permeability and allows a fuel gas to permeate to the fuel electrode 3. The support substrate 2 illustrated in FIG. 1A has conductivity. The support substrate 2 collects electricity generated in the element portion via the interconnector 6.

The material of the support substrate 2 contains, for example, an iron group metal component and an inorganic oxide. The iron group metal component in the support substrate 2 may be, for example, Ni and/or NiO. The inorganic oxide in the support substrate 2 may be a specific rare earth element oxide.

As the material of the fuel electrode 3, a generally known material may be used. As the material for the fuel electrode 3, a porous conductive ceramic, for example, a ceramic containing a solid solution of a calcium oxide, a magnesium oxide, or a rare earth element oxide in $ZrO_2$ and Ni and/or NiO may be used. As the rare earth element oxide, $Y_2O_3$ or the like, for example, is used.

Hereinafter, the solid solution of a calcium oxide, a magnesium oxide, or a rare earth element oxide in $ZrO_2$ and Ni and/or NiO is referred to as stabilized zirconia. In the present disclosure, stabilized zirconia also includes partially stabilized zirconia.

The solid electrolyte layer 4 is an electrolyte and bridges ions between the fuel electrode 3 and the air electrode 5. The solid electrolyte layer 4 also has a gas blocking property and suppresses leakage of the fuel gas and the oxygen-containing gas.

The material of the solid electrolyte layer 4 is, for example, a solid solution of from 3 mol % to 15 mol % of a rare earth element oxide in $ZrO_2$. As the rare earth element oxide, $Y_2O_3$ or the like, for example, is used. Note that another material may be used as the material of the solid electrolyte layer 4, provided that the former has the aforementioned characteristics.

The material of the air electrode 5 is not particularly limited, provided that the material is generally used for an air electrode. The material of the air electrode 5 may be, for example, a conductive ceramic such as an $ABO_3$ type perovskite oxide.

The material of the air electrode 5 may be, for example, a composite oxide in which Sr and La coexist in an A site. Examples of such a composite oxide include $La_xSr_{1-x}Co_yFe_{1-y}O_3$, $La_xSr_{1-x}MnO_3$, $La_xSr_{1-x}FeO_3$, and $La_xSr_{1-x}CoO_3$. Here, x is $0<x<1$ and y is $0<y<1$.

The air electrode 5 has gas permeability. The open porosity of the air electrode 5 may be 20% or more, particularly in the range of from 30% to 50%.

As the material of the interconnector 6, a lanthanum chromite-based perovskite oxide ($LaCrO_3$-based oxide), a lanthanum strontium titanium-based perovskite oxide ($LaSrTiO_3$-based oxide), or the like may be used. These materials have conductivity, and are neither reduced nor oxidized even when in contact with a fuel gas such as a hydrogen-containing gas and an oxygen-containing gas such as air.

The interconnector 6 is dense and suppresses leakage of the fuel gas flowing through the gas flow paths 2a located inside the support substrate 2 and the oxygen-containing gas flowing outside the support substrate 2. The interconnector 6 may have a relative density of 93% or more, particularly 95% or more.

Configuration of Cell Stack Device

Figure 2A:
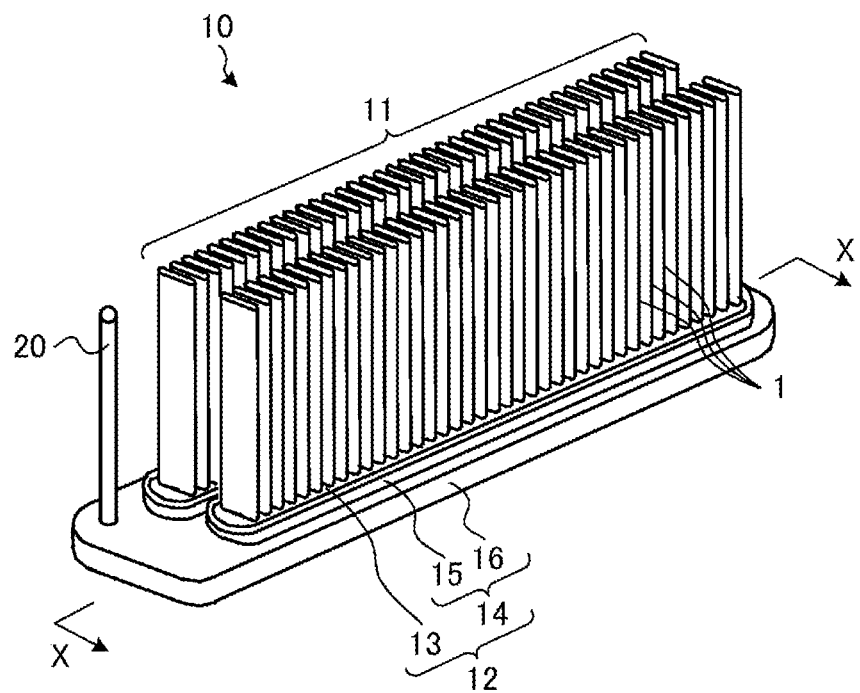
FIG. 2A is a perspective view illustrating an example of a cell stack device according to the embodiment.
Figure 2B:
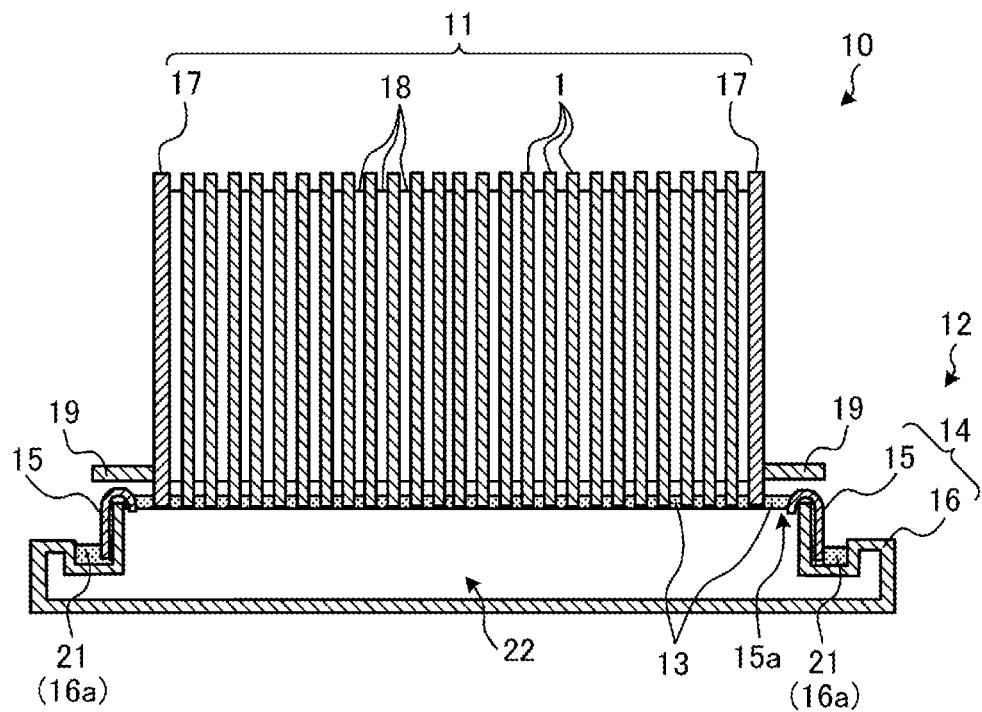
FIG. 2B is a cross-sectional view taken along line X-X illustrated in FIG. 2A.
Figure 2C:
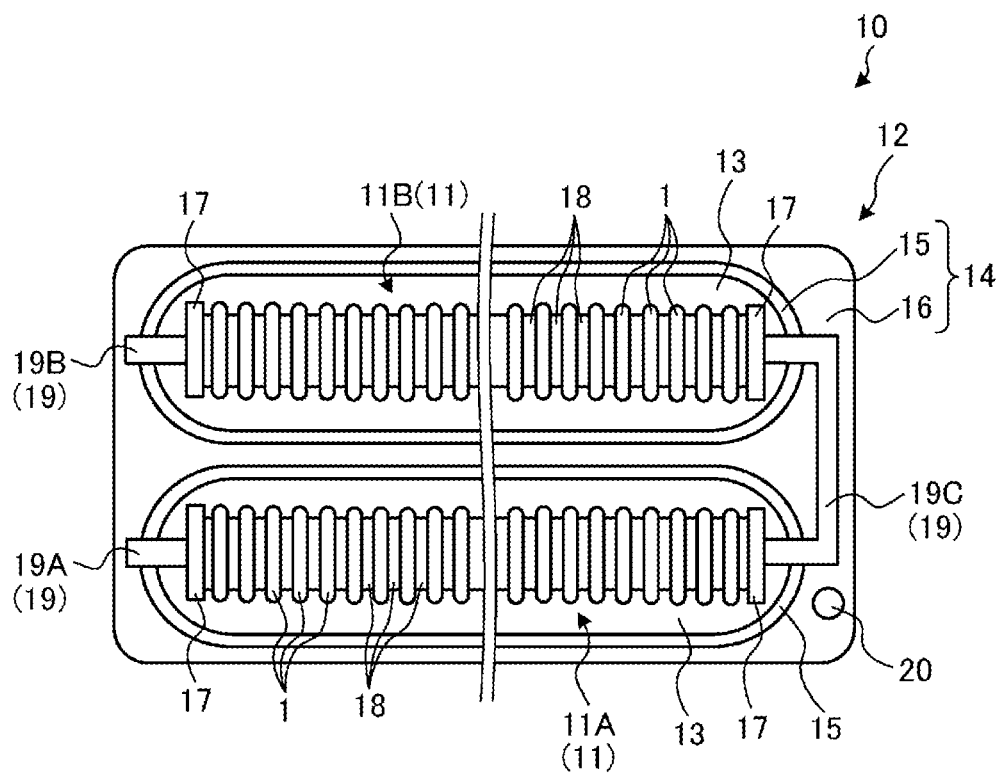
FIG. 2C is a top view illustrating an example of the cell stack device according to the embodiment.

Next, a cell stack device 10 according to the present embodiment using the cell 1 described above will be described with reference to FIGS. 2A to 2C. FIG. 2A is a perspective view illustrating an example of the cell stack device 10 according to the embodiment. FIG. 2B is a cross-sectional view taken along line X-X illustrated in FIG. 2A. FIG. 2C is a top view illustrating an example of the cell stack device 10 according to the embodiment.

As illustrated in FIG. 2A, the cell stack device 10 is provided with a cell stack 11 including a plurality of the cells 1 arrayed (stacked) in the thickness direction T (see FIG. 1A) of the cells 1, and a fixing member 12.

The fixing member 12 includes a fixing material 13 and a support member 14. The support member 14 supports the cells 1. The fixing material 13 fixes the cells 1 to the support member 14. Furthermore, the support member 14 includes a support body 15 and a gas tank 16. The support body 15 and the gas tank 16, which constitute the support member 14, are made of metal and have conductivity.

As illustrated in FIG. 2B, the support body 15 includes an insertion hole 15a into which the lower end portions of the plurality of cells 1 are inserted. The lower end portions of the plurality of cells 1 and an inner wall of the insertion hole 15a are bonded by the fixing material 13.

The gas tank 16 includes an opening portion for supplying a reaction gas to the plurality of cells 1 via the insertion hole 15a and a recessed groove 16a located in a periphery of the opening portion. An outer peripheral end portion of the support body 15 is bonded to the gas tank 16 by a bonding material 21 filled in the recessed groove 16a of the gas tank 16.

In the example illustrated in FIG. 2A, the fuel gas is stored in an internal space 22 (see FIG. 2B) formed by the support body 15 and the gas tank 16, which constitute the support member 14. The gas tank 16 includes a gas circulation pipe 20 connected thereto. The fuel gas is supplied to the gas tank 16 through the gas circulation pipe 20, and is supplied from the gas tank 16 to the gas flow paths 2a (see FIG. 1A) inside the cell 1. The fuel gas supplied to the gas tank 16 is generated by a reformer 82 (see FIG. 13) to be described below.

The hydrogen-rich fuel gas may be produced, for example, by steam reforming a raw material. The fuel gas produced by steam reforming includes steam.

The example illustrated in FIG. 2A includes two rows of the cell stacks 11, two of the support bodies 15, and the gas tank 16. Each of the two rows of the cell stacks 11 includes the plurality of cells 1. Each of the cell stacks 11 is fixed to a corresponding one of the support bodies 15. The gas tank 16 includes two through holes on an upper surface thereof. Each of the support bodies 15 is disposed in a corresponding one of the through holes. The internal space 22 is formed by one gas tank 16 and two support bodies 15.

The insertion hole 15a has, for example, an oval shape in a top surface view. The length of the insertion hole 15a, for example, in the array direction of the cells 1, that is, the thickness direction T thereof, is larger than the distance between two end current collectors 17 located at two ends of the cell stack 11. The width of the insertion hole 15a is, for example, larger than the length of the cell 1 in a width direction W (see FIG. 1A).

As illustrated in FIG. 2B, the fixing material 13 is filled and solidified in a bonding portion between the inner wall of the insertion hole 15a and the lower end portions of the cells 1. Consequently, the inner wall of the insertion hole 15a and the lower end portions of the plurality of cells 1 are bonded and fixed, and the lower end portions of the cells 1 are bonded and fixed to each other. Each of the cells 1 includes, at the lower end portions thereof, the gas flow paths 2a that communicate with the internal space 22 of the support member 14.

The fixing material 13 and the bonding material 21 can each be a material having low conductivity. As a specific material of the fixing material 13 and the bonding material 21, an amorphous glass or the like may be used, or particularly, a crystallized glass or the like may be used.

As the crystallized glass, for example, any of $SiO_2$—CaO-based, MgO—$B_2O_3$-based, $La_2O_3$—$B_2O_3$—MgO-based, $La_2O_3$—$B_2O_3$—ZnO-based, and $SiO_2$—CaO—ZnO-based materials may be used, or, particularly, a $SiO_2$—MgO-based material may be used.

Also, as illustrated in FIG. 2B, an electrically conductive member 18 that electrically connect the cells 1 in series is disposed between the cells 1 adjacent to each other (more particularly between the fuel electrode 3 of one of the cells 1 and the air electrode 5 of the other of the cells 1). More specifically, "between the cells 1 adjacent to each other" corresponds to "between the fuel electrode 3 of one of the cells 1 adjacent to each other and the air electrode 5 of the other thereof".

As illustrated in FIG. 2B, the end current collectors 17 are connected to the cells 1 on outermost sides in the array direction of the plurality of cells 1. The end current collectors 17 are each connected to an electrically conductive portion 19 protruding outward from the cell stack 11. The electrically conductive portion 19 has a function of collecting electricity generated by the cells 1 and sending the electricity thus collected to the outside. Note that FIG. 2A does not illustrate the end current collectors 17, the electrically conductive member 18, or the electrically conductive portion 19.

As illustrated in FIG. 2C, the cell stack device 10 includes two cell stacks, which are cell stacks 11A and 11B, that are connected in series and function as one battery. Thus, the electrically conductive portion 19 of the cell stack device 10 is divided into a positive electrode terminal 19A, a negative electrode terminal 19B, and a connection terminal 19C.

The positive electrode terminal 19A functions as a positive electrode when power generated by the cell stack 11 is output to the outside, and is electrically connected to the end current collector 17 on a positive electrode side in the cell stack 11A. The negative electrode terminal 19B functions as a negative electrode when power generated by the cell stack 11 is output to the outside, and is electrically connected to the end current collector 17 on a negative electrode side in the cell stack 11B.

The connection terminal 19C electrically connects the end current collector 17 on a negative electrode side in the cell stack 11A and the end current collector 17 on a positive electrode side in the cell stack 11B.

Details of End Current Collector

Figure 3:
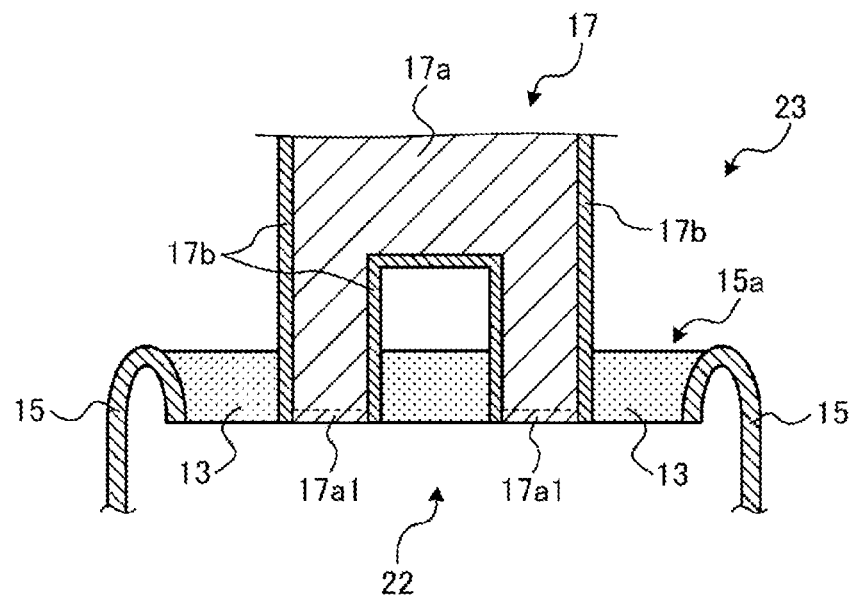
FIG. 3 is a cross-sectional view illustrating an end current collector according to an embodiment.

Next, details of the end current collector 17 according to an embodiment will be described with reference to FIG. 3. FIG. 3 is a cross-sectional view illustrating the end current collector 17 according to an embodiment. The end current collector 17 is an example of a metal member.

As illustrated in FIG. 3, one end (lower end portion in the drawing) of the end current collector 17 is inserted into the insertion hole 15a along with the plurality of cells 1 (see FIG. 2B), and is fixed to the fixing material 13 in the insertion hole 15a. That is, a side surface of the one end (lower end portion) of the end current collector 17 contacts the fixing material 13.

Further, a surface of a portion (for example, a bottom surface) in the one end (lower end portion) of the end current collector 17 is exposed to the internal space 22 formed by the support member 14 (see FIG. 2B). The internal space 22 is a space that the fuel electrode 3 of the cell 1 contacts through the support substrate 2 as described above, and is filled with a fuel gas such as a hydrogen-containing gas. That is, the internal space 22 is a reducing atmosphere.

On the other hand, a surface of the end current collector 17 other than that of the one end (lower end portion) is exposed to an external space 23. The external space 23 is a space that the air electrode 5 of the cell 1 is exposed to, and is filled with oxygen-containing gas such as air. That is, the external space 23 is an oxidizing atmosphere.

As illustrated in FIG. 3, the end current collector 17 used in such an environment is preferably covered with a covering material 17b on the surface (first surface) exposed to the oxidizing atmosphere (external space 23). The material of the covering material 17b is, for example, an electrically conductive oxide containing manganese (Mn) (e. g., ZnMn-CoO4). The covering material 17b is formed on a surface of a base material 17a by, for example, electrodeposition coating or the like. Note that, in the embodiment, the material of the base material 17a of the end current collector 17 is, for example, stainless steel.

A surface of the end current collector 17 can be covered with the covering material 17b to suppress separation of chromium (Cr) contained in the base material 17a into the oxidizing atmosphere (external space 23) during high temperature operation, thus enhancing the durability of the end current collector 17.

On the other hand, when the covering material 17b is exposed to a reducing atmosphere (for example, the internal space 22), the manganese, which is the constituent element of the covering material 17b, is reduced and separated from the covering material 17b, and the durability of the end current collector 17 may decrease.

Thus, in the embodiment, a surface (the bottom surface in the drawing) exposed to the reducing atmosphere (internal space 22) in the end current collector 17 is covered with a film different from the covering material 17b. For example, in the embodiment, the surface exposed to the reducing atmosphere is covered with a natural oxide film 17a1 of the base material 17a.

The material of the natural oxide film 17a1 is, for example, chromium oxide ($Cr_2O_3$). The constituent element of the natural oxide film 17a1 seldom has a reduction reaction even in a reducing atmosphere.

Accordingly, the separation of the constituent element from the surface (second surface) exposed to the reducing atmosphere (internal space 22) can be suppressed. Thus, the embodiment can enhance the durability of the end current collector 17 and enhance the durability of the cell stack device 10.

The natural oxide film 17a1 can be formed, for example, by forming the covering material 17b all over the surface of the base material 17a, then etching a predetermined location (here, a bottom surface) with sulfuric acid or the like, and treating an exposed surface of the base material 17a at a high temperature in an oxidizing atmosphere.

The embodiment allows for low-cost manufacturing of the end current collector 17 by covering the surface exposed to the reducing atmosphere with the natural oxide film 17a1, which can be easily formed.

Various Variations

Figure 4:
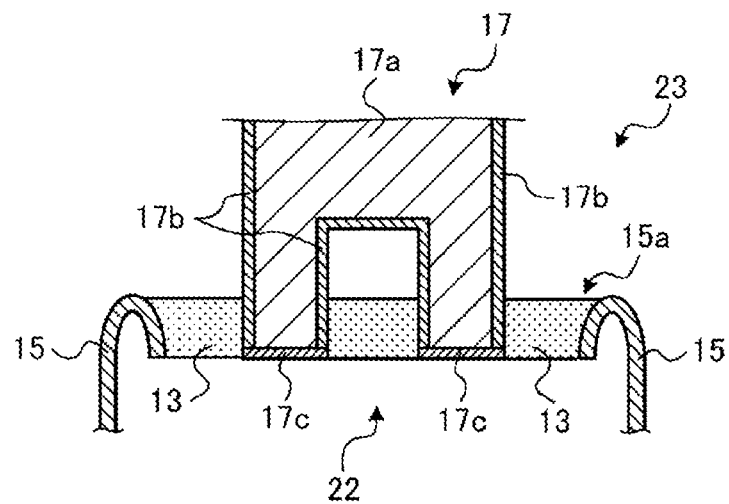
FIG. 4 is a cross-sectional view illustrating an end current collector according to a modified example 1 of the embodiment.

Next, the configuration of the end current collector 17 according to various variations of the embodiment will be described with reference to FIGS. 4 to 12. FIG. 4 is a cross-sectional view illustrating the end current collector 17 according to a modified example 1 of the embodiment.

The film covering the surface exposed to the reducing atmosphere is not limited to the natural oxide film 17a1, although the aforementioned embodiment illustrates an example in which the surface exposed to the reducing atmosphere (internal space 22) in the end current collector 17 is covered with the natural oxide film 17a1.

For example, as illustrated in FIG. 4, the surface exposed to the reducing atmosphere (internal space 22) may be covered by a reduction preventing film 17c. The constituent element of the material of the reduction preventing film 17c seldom has a reduction reaction in a reducing atmosphere, and examples thereof include forsterite and alumina ($Al_2O_3$).

The bottom surface can be covered with the reduction preventing film 17c to suppress the separation of the constituent element thereof from the surface exposed to the reducing atmosphere (internal space 22). Thus, the modified example 1 can enhance the durability of the end current collector 17, and can thereby enhance the durability of the cell stack device 10.

Further, the modified example 1, in which a material other than stainless steel can be used as the base material 17a of the end current collector 17, can realize high performance (for example, an improvement in electrical conductivity) of the end current collector 17.

Figure 5:
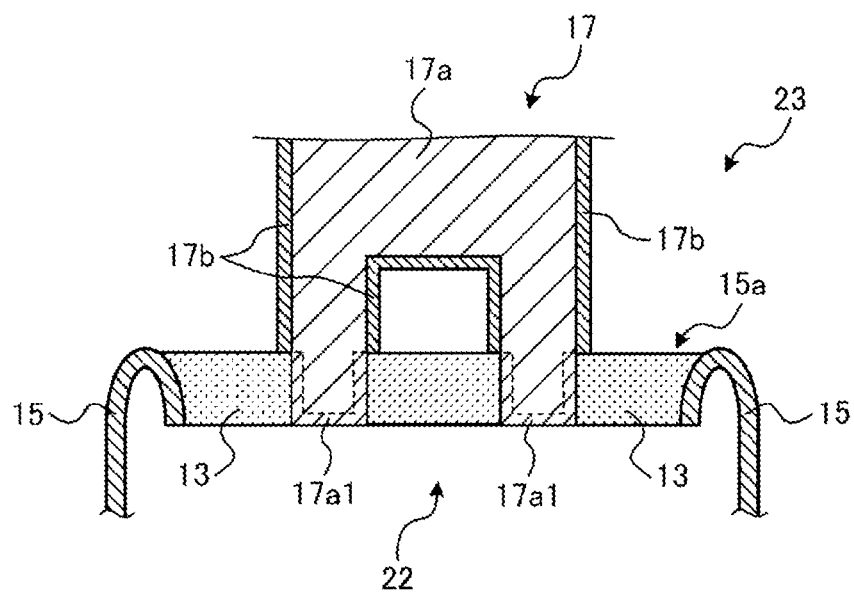
FIG. 5 is a cross-sectional view illustrating an end current collector according to a modified example 2 of the embodiment.

FIG. 5 is a cross-sectional view illustrating the end current collector 17 according to a modified example 2 of the embodiment. As illustrated in FIG. 5, in the end current collector 17 according to the modified example 2, not only the surface exposed to the reducing atmosphere (internal space 22) but also the surface (third surface) contacting the fixing material 13 are covered with a film different from the covering material 17b.

For example, in the example of FIG. 5, the surface exposed to the reducing atmosphere and the surface contacting the fixing material 13 are covered with the natural oxide film 17a1 of the base material 17a.

By covering the surface contacting the fixing material 13 with a film different from the covering material 17b, generation of cracks and the like in the covering material 17b due to manganese, which is the constituent element of the covering material 17b, being diffused during high temperature operation into the fixing material 13, which is a glass material, can be suppressed.

Thus, the modified example 2 can further enhance the durability of the end current collector 17 and can thereby further enhance the durability of the cell stack device 10.

Further, in the modified example 2, the surface exposed to the reducing atmosphere and the surface contacting the fixing material 13 can be covered with the natural oxide film 17a1 that can be easily formed, and thus the end current collector 17 can be manufactured at low cost.

Figure 6:
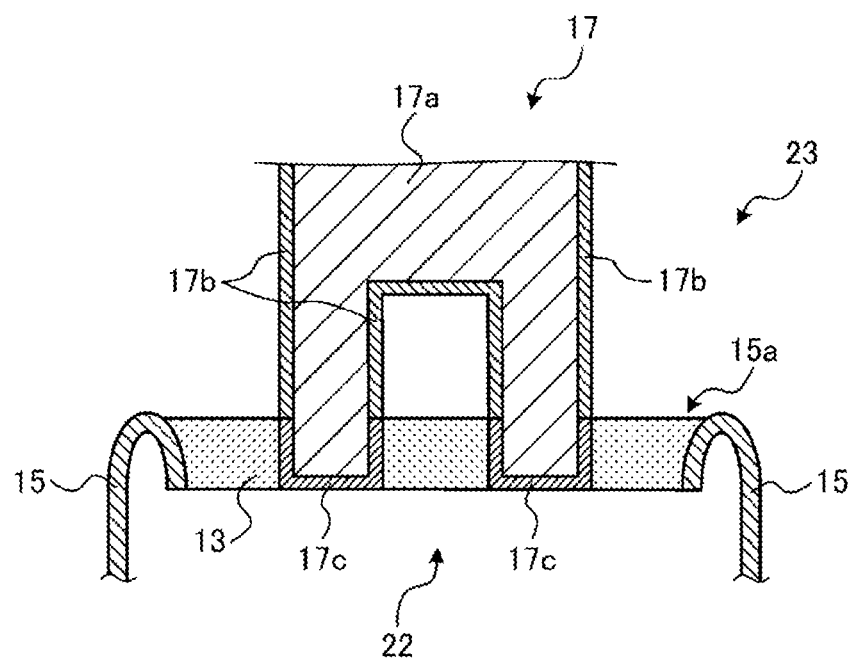
FIG. 6 is a cross-sectional view illustrating an end current collector according to a modified example 3 of the embodiment.

FIG. 6 is a cross-sectional view illustrating the end current collector 17 according to a modified example 3 of the embodiment. While FIG. 5 described above illustrates an example in which the surface exposed to the reducing atmosphere and the surface contacting the fixing material 13 are covered with the natural oxide film 17a1, the film covering these surfaces is not limited to the natural oxide film 17a1.

For example, as illustrated in FIG. 6, the surface exposed to the reducing atmosphere and the surface contacting the fixing material 13 may be covered by the reduction preventing film 17c. This can suppress the separation of the constituent elements from the surface exposed to the reducing atmosphere and the surface contacting the fixing material 13.

Thus, the modified example 3 can further enhance the durability of the end current collector 17, and can thereby further enhance the durability of the cell stack device 10.

Note that FIG. 5 and FIG. 6 respectively illustrate an example in which the natural oxide film 17a1 or the reduction preventing film 17c is located all over the surface contacting the fixing material 13 of the end current collector 17. On the other hand, in the present disclosure, the natural oxide film 17a1 or the reduction preventing film 17c may be located only in a portion of the surface that is proximate to the reducing atmosphere and contacting the fixing material 13, and the covering material 17b may be located in a portion proximate to the air.

Figure 7:
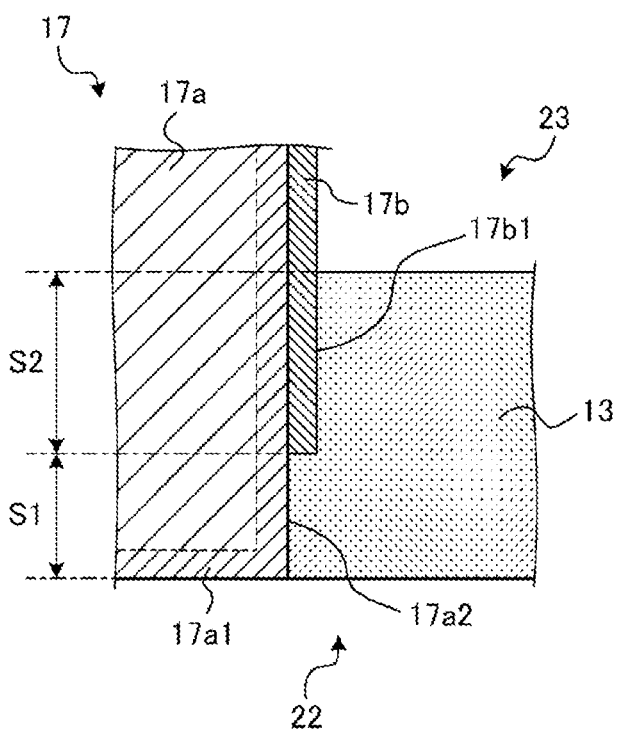
FIG. 7 is an enlarged cross-sectional view illustrating an end current collector according to a modified example 4 of the embodiment.

For example, as illustrated in FIG. 7, the natural oxide film 17a1 may be located on the internal space 22 side of the surface contacting the fixing material 13 of the end current collector 17, and the covering material 17b may be located on an external space 23 side thereof. FIG. 7 is an enlarged cross-sectional view illustrating the end current collector 17 according to a modified example 4 of the embodiment.

In the modified example 4 illustrated in FIG. 7, a surface roughness Ra of a surface 17a2 of the natural oxide film 17a1 may be greater than the surface roughness Ra of a surface 17b1 of the covering material 17b, the surface 17a2 and the surface 17b1 each contacting the fixing material 13.

Thus, the adhesion force between the end current collector 17 and the fixing material 13 can be enhanced on a reducing atmosphere side (i.e., the internal space 22 side), which is prone to peeling, by increasing the surface roughness Ra of the surface 17a2 of the natural oxide film 17a1, the surface 17a2 contacting the fixing material 13.

Additionally, the diffusion of Cr from the base material 17a into the fixing material 13 on an oxidizing atmosphere side (i.e., the external space 23 side), which is prone to diffusion of Cr, can be suppressed by reducing the surface roughness Ra of the surface 17b1 of the covering material 17b, the surface 17b1 contacting the fixing material 13.

Thus, the modified example 4 can enhance the durability of the end current collector 17, and can thereby enhance the durability of the cell stack device 10.

Further, in the modified example 4, an area S1 of the surface 17a2 of the natural oxide film 17a1 may be smaller than an area S2 of the surface 17b1 of the covering material 17b, the surface 17a2 and the surface 17b1 each contacting the fixing material 13.

This allows, during high temperature operation, for suppression of leakage of the fuel gas due to peeling of the end current collector 17 from the fixing material 13, as well as for suppression of separation of Cr contained in the base material 17a into the oxidizing atmosphere (external space 23) through the covering material 17b.

Thus, the modified example 4 can enhance the durability of the end current collector 17, and can thereby enhance the durability of the cell stack device 10.

Figure 8:
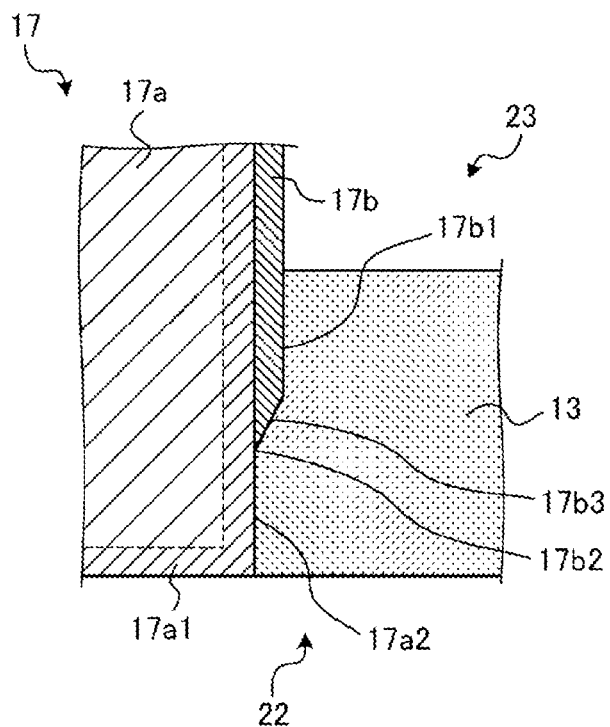
FIG. 8 is an enlarged cross-sectional view illustrating an end current collector according to a modified example 5 of the embodiment.

FIG. 8 is an enlarged cross-sectional view illustrating the end current collector 17 according to a modified example 5 of the embodiment. As illustrated in FIG. 8, in the modified example 5, the covering material 17b may include a surface 17b3 that is located on a side of an end (lower end portion) 17b2 of the covering material 17b and connects the surface 17a2 of the natural oxide film 17a1 and the surface 17b1 of the covering material 17b. The surface 17b3 is, for example, a tapered surface inclined with respect to the surface 17b1 of the covering material 17b.

Thus, the covering material 17b having the surface 17b3 increases the contact area between the covering material 17b and the fixing material 13. This can enhance the durability of the end current collector 17, and can thereby enhance the durability of the cell stack device 10.

Figure 9:
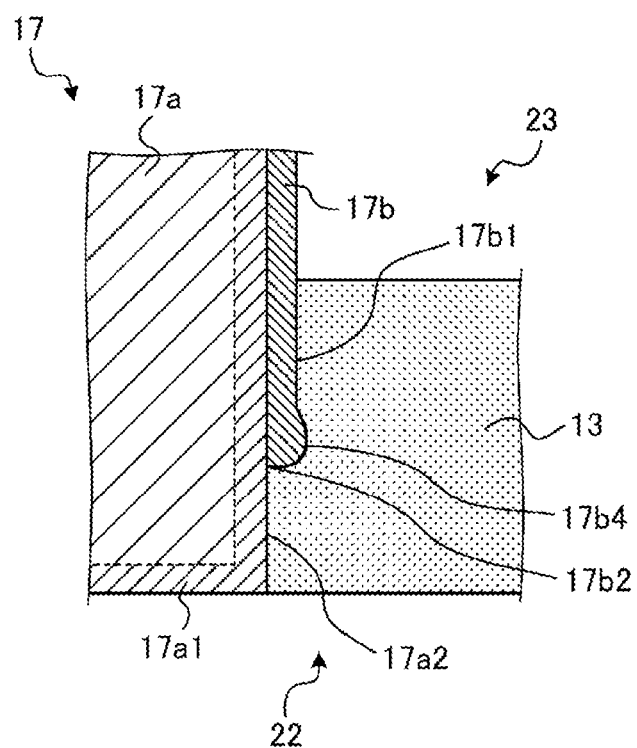
FIG. 9 is an enlarged cross-sectional view illustrating an end current collector according to a modified example 6 of the embodiment.

FIG. 9 is an enlarged cross-sectional view illustrating the end current collector 17 according to a modified example 6 of the embodiment. As illustrated in FIG. 9, in the modified example 6, the covering material 17b may include a protruding portion 17b4 that is located on the end (lower end portion) 17b2 side of the covering material 17b and protrudes away from the end current collector 17 to face the fixing material 13.

Thus, the covering material 17b having the protruding portion 17b4 increases the contact area between the covering material 17b and the fixing material 13. This can enhance the durability of the end current collector 17, and can thereby enhance the durability of the cell stack device 10.

Note that while FIGS. 8 and 9 respectively illustrate the covering material 17b including the surface 17b3 or the protruding portion 17b4, the covering material 17b may include the surface 17b3 and the protruding portion 17b4.

Figure 10:
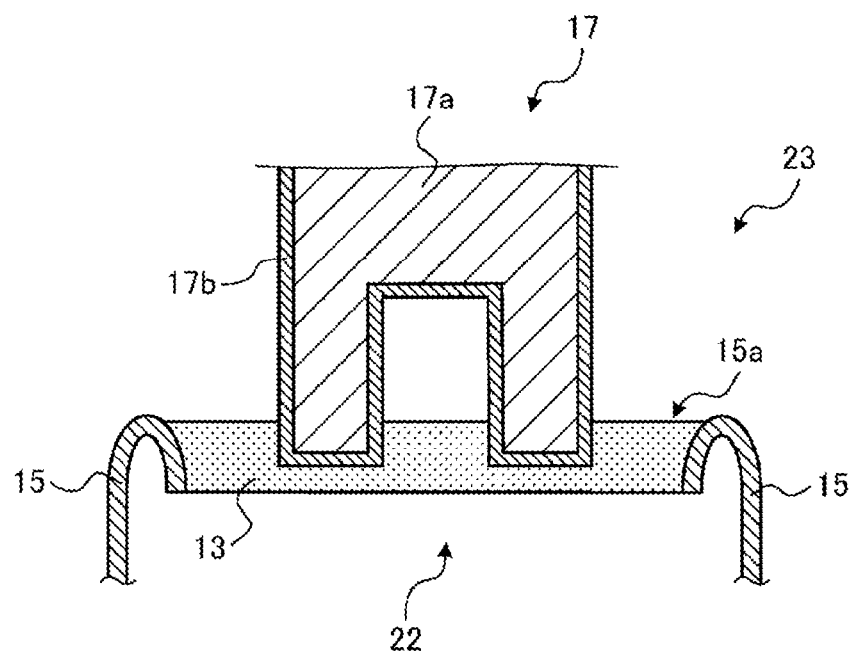
FIG. 10 is a cross-sectional view illustrating an end current collector according to a modified example 7 of the embodiment.

FIG. 10 is a cross-sectional view illustrating the end current collector 17 according to a modified example 7 of the embodiment. While the aforementioned embodiment and modified examples 1 to 6 each illustrate a configuration in which a portion of the end current collector 17 is exposed to the internal space 22, the end current collector 17 may not necessarily be exposed to the internal space 22.

FIG. 10 illustrates a configuration in which the entire surface of the end current collector 17 is covered with the covering material 17b with an end (the lower end portion in the drawing) of the end current collector 17 remaining inside the fixing material 13 and not protruding from the fixing material 13 into the internal space 22.

By not exposing the end current collector 17 to the reducing atmosphere (internal space 22), reduction of manganese, which is the constituent element of the covering material 17b, and separation thereof from the covering material 17b can be suppressed. Thus, the modified example 7 can enhance the durability of the end current collector 17, and can thereby enhance the durability of the cell stack device 10.

Further, the modified example 7 requires no etching processing or the like after the formation of the covering material 17b all over the surface of the base material 17a, and thus allows for low-cost manufacturing of the end current collector 17.

Figure 11:
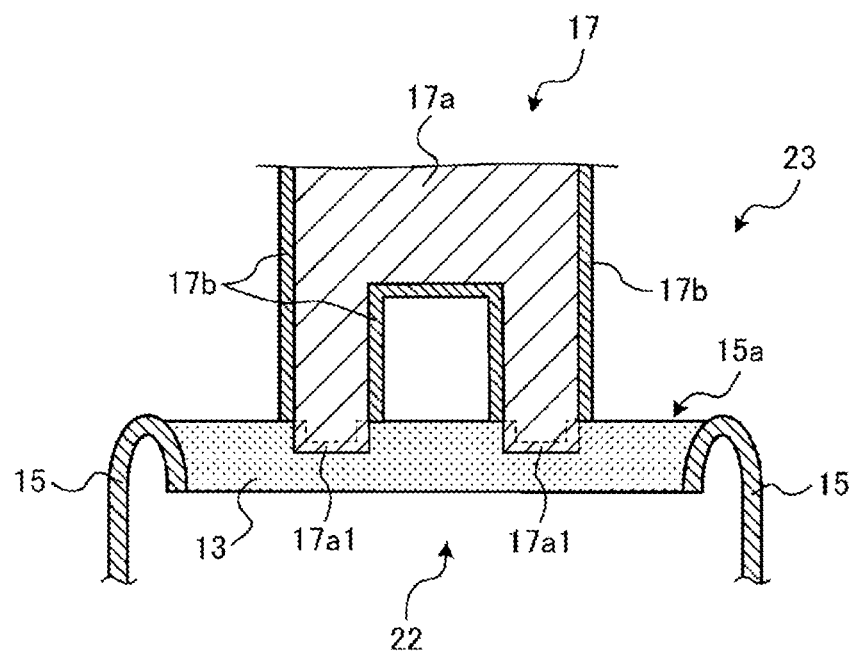
FIG. 11 is a cross-sectional view illustrating an end current collector according to a modified example 8 of the embodiment.

FIG. 11 is a cross-sectional view illustrating the end current collector 17 according to a modified example 8 of the embodiment. As illustrated in FIG. 11, the end current collector 17 according to the modified example 8 includes the surface contacting the fixing material 13 covered with a film different from the covering material 17b. For example, in the example of FIG. 11, the surface contacting the fixing material 13 is covered with the natural oxide film 17a1 of the base material 17a.

By covering the surface contacting the fixing material 13 with a film different from the covering material 17b, generation of cracks and the like in the covering material 17b due to manganese, which is the constituent element of the covering material 17b, being diffused during high temperature operation into the fixing material 13, which is a glass material, can be suppressed.

Thus, the modified example 8 can further enhance the durability of the end current collector 17, and can thereby enhance the durability of the cell stack device 10.

Figure 12:
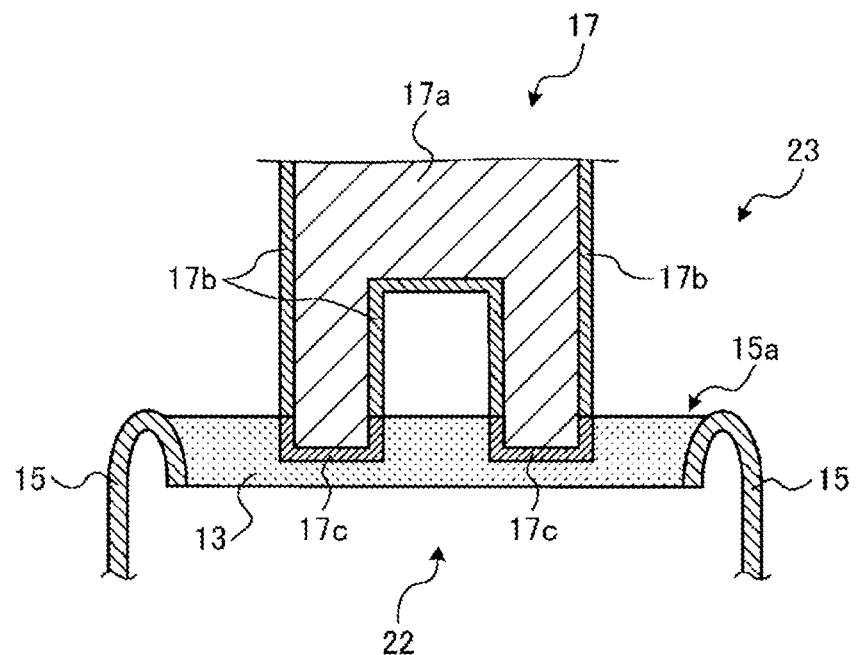
FIG. 12 is cross-sectional view illustrating an end current collector according to a modified example 9 of the embodiment.

FIG. 12 is a cross-sectional view illustrating the end current collector 17 according to a modified example 9 of the embodiment. While the aforementioned example of FIG. 11 illustrates a configuration in which the surface contacting the fixing material 13 is covered with the natural oxide film 17a1, the film covering the surface contacting the fixing material 13 is not limited to the natural oxide film 17a1.

For example, as illustrated in FIG. 12, the surface contacting the fixing material 13 may be covered with the reduction preventing film 17c. This allows generation of cracks and the like in the covering material 17b due to manganese, which is the constituent element of the covering material 17b, being diffused during high temperature operation into the fixing material 13, which is a glass material, to be suppressed.

Thus, the modified example 9 can further enhance the durability of the end current collector 17, and can thereby enhance the durability of the cell stack device 10.

Module

Figure 13:
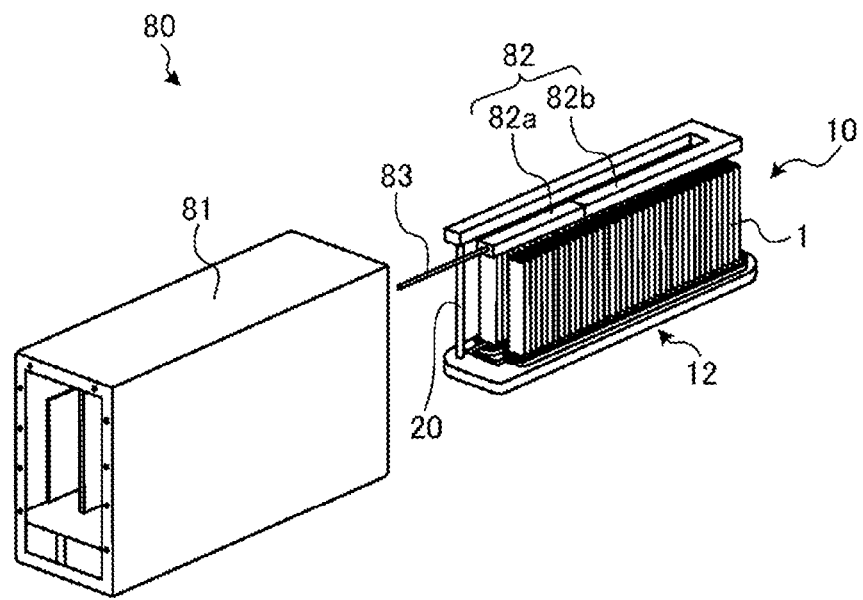
FIG. 13 is an external perspective view illustrating an example of a module according to an embodiment.

Next, a module 80 according to the embodiment of the present disclosure using the cell stack device 10 described above will be described with reference to FIG. 13. FIG. 13 is an exterior perspective view illustrating the module 80 according to an embodiment, and illustrates a state in which a front surface and a rear surface, which are parts of a housing 81, are removed and the cell stack device 10 housed therein is extracted to the rear.

As illustrated in FIG. 13, the module 80 includes the housing 81 and the cell stack device 10 housed in the housing 81. A reformer 82 is disposed above the cell stack device 10.

The reformer 82 generates a fuel gas by reforming a raw fuel such as natural gas and kerosene, and supplies the fuel gas thus generated to the cell 1. The raw fuel is supplied to the reformer 82 through a raw fuel supply pipe 83. The reformer 82 may include a vaporizing unit 82*a* for vaporizing water and a reforming unit 82*b*.

The reforming unit 82*b* includes a reforming catalyst (not illustrated) and reforms the raw fuel into the fuel gas. The reformer 82 can perform steam reforming, which is a highly efficient reforming reaction.

The fuel gas generated by the reformer 82 is supplied to the gas flow paths 2*a* (see FIG. 1A) of the cell 1 through the gas circulation pipe 20, the gas tank 16, and the fixing member 12.

Furthermore, in the module 80 having the configuration described above, the temperature in the module 80 during normal power generation is approximately from 500° C. to 1000° C. due to combustion of the gas and power generation by the cells 1.

As described above, the module 80 can be configured to house the cell stack device 10 having high durability, resulting in the module 80 having high durability.

Module Housing Device

Figure 14:
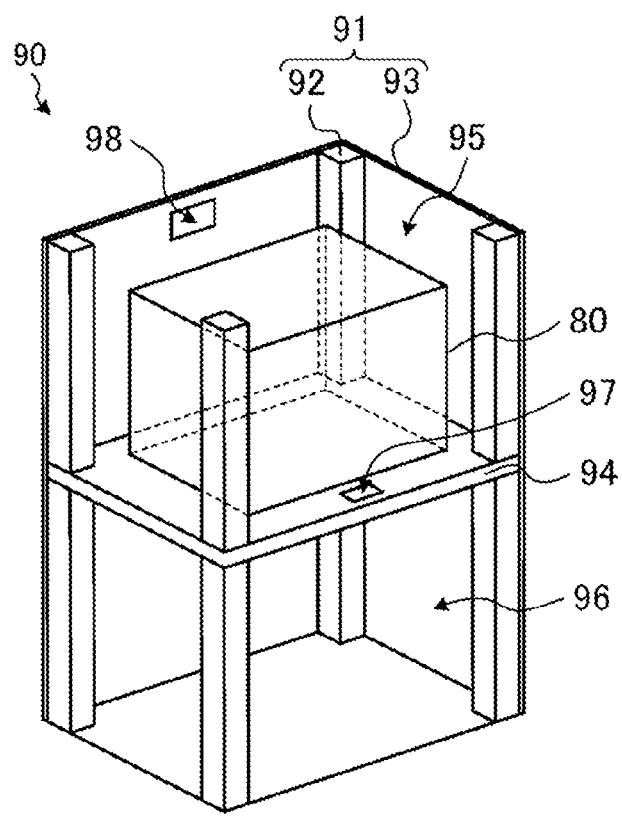
FIG. 14 is an exploded perspective view schematically illustrating an example of a module housing device according to an embodiment.

FIG. 14 is an exploded perspective view illustrating an example of a module housing device 90 according to an embodiment. The module housing device 90 according to the embodiment includes an external case 91, the module 80 illustrated in FIG. 13, and an auxiliary device (not illustrated). The auxiliary device operates the module 80. The module 80 and the auxiliary device are housed in the external case 91. Note that parts of the configuration are omitted in FIG. 14.

The external case 91 of the module housing device 90 illustrated in FIG. 14 includes columns 92 and an external plate 93. A dividing plate 94 divides the inside of the external case 91 into upper and lower portions. The space above the dividing plate 94 in the external case 91 is a module housing chamber 95 for housing the module 80, and the space below the dividing plate 94 in the external case 91 is an auxiliary device housing chamber 96 for housing the auxiliary device, which operates the module 80. Note that FIG. 14 does not illustrate the auxiliary device housed in the auxiliary device housing chamber 96.

The dividing plate 94 includes an air distribution hole 97 for causing air in the auxiliary device housing chamber 96 to flow toward the module housing chamber 95. The external plate 93 forming the module housing chamber 95 includes an exhaust hole 98 for exhausting air in the module housing chamber 95.

As described above, the module housing device 90 can be provided with the module 80 having high durability in the module housing chamber 95, resulting in the module housing device 90 having high durability.

While the present disclosure has been described in detail, the present disclosure is not limited to the aforementioned embodiments, and various changes, improvements, and the like can be made without departing from the gist of the present disclosure.

The present embodiment has exemplified a vertically striped cell stack device including "vertically striped" cells arrayed on a surface of the support substrate, the cells each being provided with only one power generating element part including the fuel electrode, the solid electrolyte layer, and the air electrode. The present disclosure can be applied to a horizontally striped cell stack device including "horizontally striped" cells. The horizontally striped cell stack device includes the power generating element part at each of a plurality of locations apart from each other on the support substrate, and the power generating element parts adjacent to each other are electrically connected to each other.

The present embodiment has also exemplified a case where a hollow flat plate-shaped support substrate is used. The present disclosure can also be applied to a cell stack device using a cylindrical-shaped support substrate. The present disclosure can also be applied to a flat plate-shaped cell stack device in which "flat plate-shaped" cells are arrayed in the thickness direction.

Furthermore, the aforementioned embodiment illustrates an example in which a fuel electrode is provided on a support substrate and an air electrode is disposed on a surface of a cell. The present disclosure can also be applied to an opposite arrangement, that is, a cell stack device in which an air electrode is provided on a support substrate and a fuel electrode is disposed on a surface of a cell.

The "cell", the "cell stack device", the "module", and the "module housing device", which are exemplified in the aforementioned embodiment by a fuel cell, a fuel cell stack device, a fuel cell module, and a fuel cell device, respectively, may also be exemplified by an electrolytic cell, an electrolytic cell stack device, an electrolytic module, and an electrolytic device, respectively.

As described above, the cell stack device 10 according to the embodiment includes the cell stack 11 and the end current collector 17. The cell stack 11 includes the plurality of cells 1 arrayed therein. The end current collector 17 is located in an end portion of the cell stack 11 in the array direction of the plurality of cells 1. The end current collector 17 includes the surface exposed to the oxidizing atmosphere (external space 23) covered with the covering material 17*b* containing manganese and the surface exposed to the reducing atmosphere (internal space 22) covered with a film different from the covering material 17*b*. This can enhance the durability of the cell stack device 10.

The cell stack device 10 according to the embodiment further includes the fixing material 13 that fixes the cells 1 and the end current collector 17. The end current collector 17 includes the surface contacting the fixing material 13 covered with a film different from the covering material 17*b*. This can further enhance the durability of the cell stack device 10.

The cell stack device 10 according to the embodiment further includes the fixing material 13 that fixes the cells 1 and the end current collector 17. On the surface contacting the fixing material 13 in the end current collector 17, the covering material 17*b* and a film different from the covering material 17*b* are provided. This can enhance the durability of the cell stack device 10.

In the cell stack device 10 according to the embodiment, the surface roughness of the film different from the covering material 17*b*, the film being located on the surface contacting the fixing material 13 in the end current collector 17, is greater than the surface roughness of the covering material 17*b* located on the surface contacting the fixing material 13 in the end current collector 17. This can enhance the durability of the cell stack device 10.

In the cell stack device 10 according to the embodiment, the area S1 of the film different from the covering material 17*b*, the film being located on the surface contacting the fixing material 13 in the end current collector 17, is smaller than the area S2 of the covering material 17*b* located on the surface contacting the fixing material 13 in the end current collector 17. This can enhance the durability of the cell stack device 10.

In the cell stack device 10 according to the embodiment, the end current collector 17 is constituted by stainless steel, and the film different from the covering material 17b is the natural oxide film 17a1 located on the surface of the stainless steel. This can enhance the durability of the cell stack device 10, and allows for low-cost manufacturing of the end current collector 17.

In the cell stack device 10 according to the embodiment, a film different from the covering material 17b is the reduction preventing film 17c. This can enhance the durability of the cell stack device 10, and can also enhance the performance of the end current collector 17.

The cell stack device 10 according to the embodiment includes the cell stack 11 and the end current collector 17. The cell stack 11 includes the plurality of cells 1 arrayed therein. The end current collector 17 is located in an end portion of the cell stack 11 in the array direction of the plurality of cells 1. The end current collector 17 is not exposed to the reducing atmosphere (internal space 22). This can enhance the durability of the cell stack device 10.

In the cell stack device 10 according to the embodiment, the end current collector 17 is covered with the covering material 17b containing manganese. This can enhance the durability of the cell stack device 10, and allows for low-cost manufacturing of the end current collector 17.

The cell stack device 10 according to the embodiment further includes the fixing material 13 that fixes the cells 1 and the end current collector 17. The end current collector 17 includes the surface exposed to the oxidizing atmosphere (external space 23) covered with the covering material 17b containing manganese, and in the end current collector 17, the surface contacting the fixing material 13 covered with a film different from the covering material 17b. This can further enhance the durability of the cell stack device 10.

The module 80 according to the embodiment includes the aforementioned cell stack device 10 housed in the housing 81. This can yield the module 80 having high durability.

The module housing device 90 according to the embodiment includes the aforementioned module 80 and the auxiliary device for operating the module 80, both of which are housed in the external case 91. This can yield the module housing device 90 having high durability.

The metal member (end current collector 17) according to the embodiment includes the surface exposed to the oxidizing atmosphere (external space 23) and the surface exposed to the reducing atmosphere (internal space 22). The surface exposed to the oxidizing atmosphere (external space 23) is covered with the covering material 17b containing manganese, and the surface exposed to the reducing atmosphere (internal space 22) is covered with a film different from the covering material 17b. This can enhance the durability of the end current collector 17.

The embodiment disclosed herein is considered exemplary in all respects and not restrictive. Indeed, the aforementioned embodiment can be embodied in a variety of forms. Furthermore, the aforementioned embodiment may be omitted, replaced, or changed in various forms without departing from the scope of the appended claims and the purpose thereof.

The invention claimed is:

1. A cell stack device, comprising:
a cell stack comprising a plurality of cells arrayed therein; and
an end current collector comprising:
a single metal member located in an end portion of the cell stack in an array direction of the plurality of cells,
a first surface exposed to an oxidizing atmosphere, at least a portion of the first surface being covered with a covering material comprising manganese and at least a portion of the first surface being covered with a first film that is different from the covering material, and
a second surface exposed to a reducing atmosphere, at least a portion of the second surface being covered with the first film, wherein the first film produces less of a reduction reaction in the reducing atmosphere than the covering material; and
a fixing material for fixing the plurality of cells and the end current collector, wherein a portion of the first surface covered by the covering material contacts the fixing material and a portion of the first surface covered by the first film contacts the fixing material,
wherein a surface roughness of the first film contacting the fixing material is greater than a surface roughness of the covering material contacting the fixing material.

2. The cell stack device according to claim 1, wherein an area of the first film contacting the fixing material is smaller than an area of the covering material contacting the fixing material.

3. The cell stack device according to claim 1, wherein
the end current collector is composed of stainless steel, and
the first film is a natural oxide film located on a surface of the stainless steel.

4. The cell stack device according to claim 1, wherein the first film is a reduction preventing film.

5. A metal member, comprising:
a first surface exposed to an oxidizing atmosphere; and
a second surface exposed to a reducing atmosphere, wherein
at least a portion of the first surface is covered with a covering material comprising manganese and at least a portion of the first surface is covered with a first film that is different from the covering material, and
at least a portion of the second surface is covered with the first film, wherein the first film produces less of a reduction reaction in the reducing atmosphere than the covering material,
wherein a portion of the first surface covered by the covering material contacts a fixing material and a portion of the first surface covered by the first film contacts the fixing material, and
wherein a surface roughness of the first film contacting the fixing material is greater than a surface roughness of the covering material contacting the fixing material.

6. The metal member according to claim 5, wherein an area of the first film contacting the fixing material is smaller than an area of the covering material contacting the fixing material.

7. The metal member according to claim 5, wherein
the metal member is composed of stainless steel, and
the first film is a natural oxide film located on a surface of the stainless steel.

8. The metal member according to claim 5, wherein the first film is a reduction preventing film.

9. A cell stack device, comprising:
a cell stack comprising a plurality of cells arrayed therein;
an end current collector located in an end portion of the cell stack in an array direction of the plurality of cells, the end current collector comprising:
a first surface exposed to an oxidizing atmosphere, at least a portion of the first surface being covered with a covering material comprising manganese, and a second surface exposed to a reducing atmosphere, at least a portion of the second surface being covered with a first film different from the covering material, wherein the first film produces less of a reduction reaction in the reducing atmosphere than the covering material; and a fixing material for fixing the plurality of cells and the end current collector, wherein a portion of the first surface covered by the covering material contacts the fixing material and a portion of the first surface covered by the first film contacts the fixing material, wherein a surface roughness of the first film contacting the fixing material is greater than a surface roughness of the covering material contacting the fixing material.

10. The cell stack device according to claim 9, wherein an area of the first film contacting the fixing material is smaller than an area of the covering material contacting the fixing material.

11. The cell stack device according to claim 9, wherein the end current collector is composed of stainless steel, and the first film is a natural oxide film located on a surface of the stainless steel.

12. The cell stack device according to claim 9, wherein the first film is a reduction preventing film.

* * * * *